(12) United States Patent
Pratt

(10) Patent No.: US 6,865,211 B2
(45) Date of Patent: Mar. 8, 2005

(54) GAS LASER AND OPTICAL SYSTEM

(75) Inventor: Roland Henry Pratt, Bristol (GB)

(73) Assignee: Renishaw, PLC, Gloucestershire (GB)

( * ) Notice: Subject to any disclaimer, the term of this patent is extended or adjusted under 35 U.S.C. 154(b) by 0 days.

(21) Appl. No.: 10/048,053

(22) PCT Filed: Jun. 8, 2001

(86) PCT No.: PCT/GB01/02616
§ 371 (c)(1),
(2), (4) Date: Jan. 25, 2002

(87) PCT Pub. No.: WO01/95441
PCT Pub. Date: Dec. 13, 2001

(65) Prior Publication Data
US 2002/0131467 A1 Sep. 19, 2002

(30) Foreign Application Priority Data
Jun. 8, 2000 (GB) .......................... 00138339

(51) Int. Cl.⁷ .............................................. H01S 3/22
(52) U.S. Cl. ..................................................... 372/55
(58) Field of Search .............................. 372/54–55, 32, 372/37, 27, 59, 28; 356/517, 485

(56) References Cited

U.S. PATENT DOCUMENTS

| 3,594,659 | A | * | 7/1971 | Brandli et al. ................. 372/32 |
| 4,110,045 | A | * | 8/1978 | Smith et al. ................. 356/467 |
| 4,227,802 | A | * | 10/1980 | Scholdstrom et al. ...... 356/5.15 |
| 4,410,992 | A | * | 10/1983 | Javan ........................... 372/32 |
| 4,475,199 | A | * | 10/1984 | Sanders et al. ................ 372/37 |
| 4,482,249 | A | * | 11/1984 | Smith et al. ................. 356/467 |
| 4,492,862 | A | * | 1/1985 | Grynberg et al. ........... 250/255 |
| 4,535,241 | A | * | 8/1985 | Eberhardt .............. 250/339.13 |
| 4,767,210 | A | * | 8/1988 | Kashyap ..................... 356/477 |
| 4,844,593 | A |  | 7/1989 | Parker et al. |
| 4,987,574 | A | * | 1/1991 | Rowley et al. ................ 372/28 |
| 6,327,039 | B1 | * | 12/2001 | de Groot et al. ............ 356/517 |
| 6,330,065 | B1 | * | 12/2001 | Hill ............................. 356/485 |
| 6,381,025 | B1 | * | 4/2002 | Bornhop et al. ............ 356/517 |
| 6,434,176 | B1 | * | 8/2002 | Deck ............................ 372/32 |

FOREIGN PATENT DOCUMENTS

WO  WO 89/05955  6/1989

* cited by examiner

Primary Examiner—Wilson Lee
Assistant Examiner—Hung Tran Vy
(74) Attorney, Agent, or Firm—Oliff & Berridge, PLC

(57) ABSTRACT

An optical apparatus e.g. an interferometric displacement determination device: spectroscopic analysis apparatus; polarisation measurement apparatus; or a heterodyne frequency measurement device has a linear HeNe gas laser having an Ne content of an $Ne^{20}$ isotope and an $Ne^{22}$ isotope in substantially equal proportions, the apparatus in use having optical feedback toward the laser causing, 0.1% or more of the light output of the laser to be returned toward the laser (1). Use of this type of laser provides good polarisation stability even though excessive backreflection may occur, and hence the laser's frequency can be readily controlled.

12 Claims, 1 Drawing Sheet

GAS LASER AND OPTICAL SYSTEM

BACKGROUND OF THE INVENTION

1. Field of Invention

The invention relates to a Helium-Neon gas laser and an optical system used therewith.

2. Description of Related Art

Typically gas lasers are used in apparatus which rely on the specific frequency of the laser light, for example light having a known wavelength can be used for interferometric measurement. Laser light at a specific frequency is used as a reference to measure the frequency of other light for example in heterodyne frequency measurement systems. Laser spectroscopy requires a light of narrowly defined frequency also. Laser light of a specific polarisation and frequency can be used for polarisation measurement.

Helium-Neon (HeNe) lasers are well suited to these applications since they produce a convenient frequency and are readily controllable.

Laser interferometers are shown in U.S. Pat. Nos. WO98/05955 and U.S. Pat. No. 4,844,593. One subject discussed in these documents is the prevention or reduction of laser output light being reflected back toward the laser (known as "optical feedback" or "back-reflection") The amount of back-reflection can be determined from known optical parameters of the optical elements used. However, only a small proportion of back-reflected light reaches the laser cavity i.e. approximately 1 to 5 hundredths of the back-reflected light.

Back-reflection is undesirable in the devices mentioned above and in all devices which require a specific frequency of laser light, because excessive back-reflection interacts with the laser to change the polarisation and output frequency of the laser light. Various HeNe lasers suffer from sensitivity to back-reflection.

HeNe lasers having gas mixes of varying proportions are known. U.S. Pat. No. 4,475,199 describes a ring laser having a HeNe mix consisting of dual isotopes of $Ne^{20}$ and $Ne^{22}$. Equal proportions of these two isotopes are mixed with the He. It has now been recognised by the inventor that this mixture when used in a linear laser gives good polarisation stability and hence frequency stability in the resonant cavity of the laser when subjected to back-reflections. Therefore a laser of this type is ideal for use in back-reflective situations encountered in the devices described above.

SUMMARY OF THE INVENTION

According to a first aspect of the invention there is provided an optical apparatus comprising a frequency stabilised linear HeNe gas laser having an Ne content of an $Ne^{20}$ isotope and an $Ne^{22}$ isotope in substantially equal proportions, the apparatus in use having optical feedback toward the laser causing at least 0.1% of the light output of the laser to be returned toward the laser.

The optical apparatus may be for example an interferometric displacement determination device; a polarisation measurement device; spectroscopic analysis apparatus; or a heterodyne frequency measurement device.

Where the optical apparatus is an interferometric displacement determination device, the device may be any one of a single beam (e.g. Fabry-Perot), a plane mirror, a long range, or an optical fibre type.

BRIEF DESCRIPTION OF THE DRAWING

The FIGURE illustrates one embodiment of the invention and shows a plane mirror interferometer including an optical fibre.

DETAILED DESCRIPTION OF PREFERRED EMBODIMENTS

Figure 1:
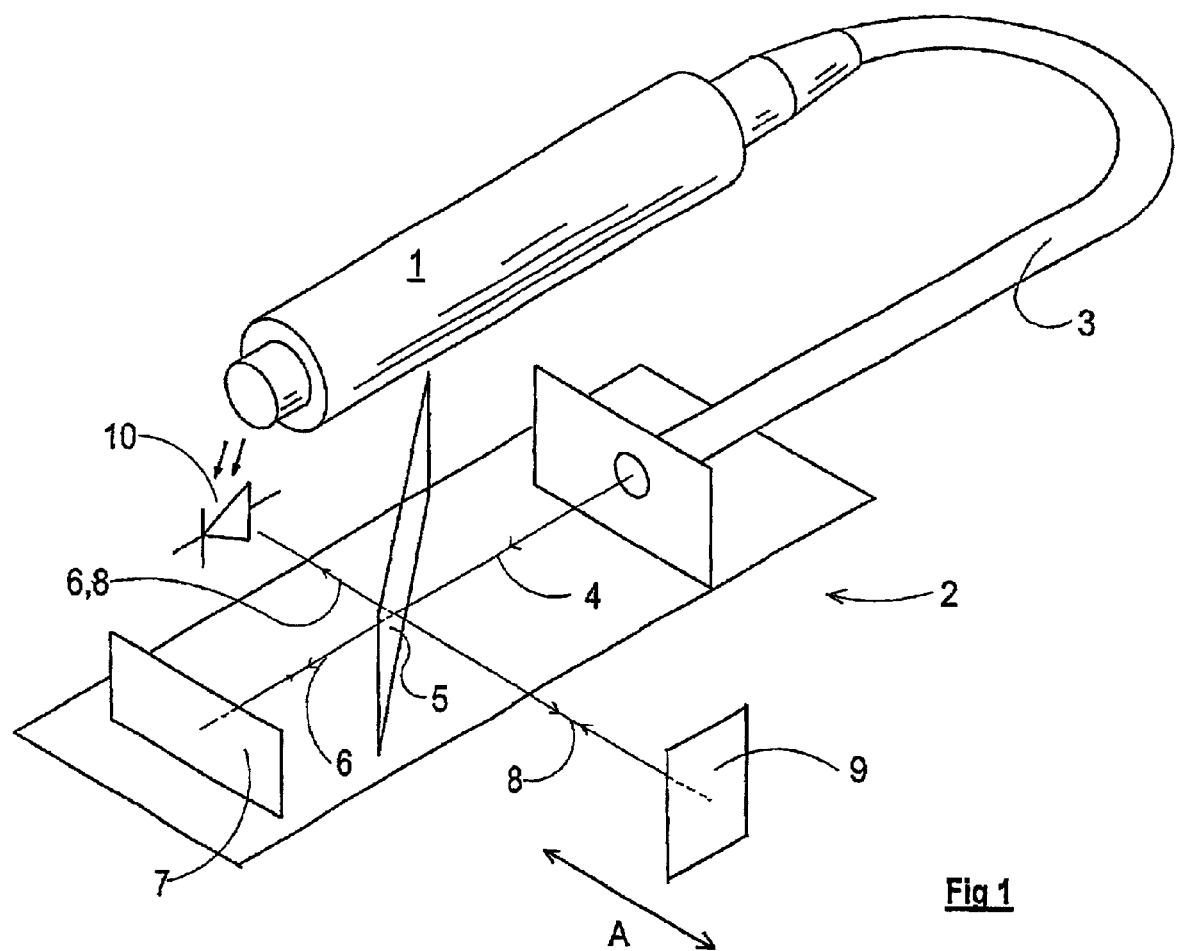

The FIGURE shows a HeNe laser 1 used to provide constant frequency coherent light to an interferometric measurement apparatus 2 via an optical fibre 3. The principle of operation of an interferometer of this type is well known, but briefly:

Optical fibre output beam 4 is split into two by beam splitter 5; reference beam 6 propagates toward fixed mirror 7 and back toward the optical fibre; measurement beam 8 propagates toward movable mirror 9 and back toward the optical fibre. Beams 6 and 8 are combined to form interference fringes. These fringes are detected at detector 10 and counted to provide an indication of the distance moved by mirror 9 in the direction of arrows A.

It follows that in order to determine the displacement of mirror 9, the wavelength of the light used must be known. The more stable the frequency of this light the more accurate is the measurement of displacement.

Back-reflection is particularly problematic in this system because the laser is coupled to an optical fibre. In this system a normally problematic proportion of laser output light i.e. greater than 0.1% is back-reflected toward the laser resonant cavity. This back-reflected light comes from, for example, the fibre entry, the sides of the fibre, the fibre exit, the fibre core, and a proportion of the light 6 and 8 reflected from mirrors 7 and 9.

Thus this apparatus demands stable frequency output at the laser and benefits from a gas laser having a high tolerance to back-reflections. In this instance the resonant cavity of the laser is filled with gas containing 80–90% He and 10–20% Ne. The Ne content is a dual-isotope of $Ne^{20}$ and $Ne^{22}$ in substantially equal proportions i.e. any ratio between 60:40 and 40:60 respectively. This gas mixture allows back-reflected light levels in excess of 0.1% of the laser light output, without destabilisation of the output polarisation. As a result of the polarisation stability, a stable frequency is obtainable also. Such back-reflections may occur continuously or at intervals. The laser achieves a frequency stabilisation below $1 \times 10^{-7}$ (Frequency noise/Absolute frequency) when an appropriate frequency control system is used.

Whilst many frequency control methods are known, the preferred method employed is modal control because it was found to be reliable and cost effective. In this instance mode ratio control was used.

It has been noted by the inventor from experimental results that the back-reflection destabilisation threshold (i.e. the level of back-reflected light at which a laser becomes unusably unstable) is approximately 10% of laser output for the above-mentioned laser but only about 1% for a conventional "natural" Ne laser i.e. a laser having a $Ne^{20}$ to $Ne^{22}$ isotope ratio of approximately 9:1 respectively.

The inventor has found also that such a conventional laser with a "natural", (9:1) Ne isotope mix has a slightly better stability compared with the 1:1 Ne isotope mix laser when each is subjected to a back-reflection which is less than about 0.1% of laser light output. Consequently the 1:1 $Ne^{20}$ to $Ne^{22}$ isotope mix has been found to be best suited to optical apparatus with a relatively high optical feedback i.e. greater than about 0.1% of laser light output.

Other applications of a laser of this type, within the ambit of this invention, are envisaged. For example, the linear laser described above might be used with spectroscopic analysis apparatus, polarisation measurement apparatus, or a heterodyne frequency measurement device each of which may benefit from a laser of the type mentioned above having a stable frequency output, particularly when back-reflections exceed approximately 0.1% of total laser output.

Stabilisation of the laser output frequency may be undertaken by any of the following known techniques: the "Lamb Dip" technique; general intensity control; Zeeman frequency or intensity control; or modal control either balanced where the intensity of two modes is set to be equal or a ratio of modes, where the intensity ratio of the two modes is fixed.

What is claimed is:

1. An optical apparatus comprising:
    a frequency stabilized linear HeNe gas laser having a resonant cavity, the resonant cavity being filled with a gas including a He content and a Ne content, the Ne content comprising a $Ne^{20}$ isotope and a $Ne^{22}$ isotope in substantially equal proportions; and
    at least one optical feedback element which receives light output from the laser and returns at least 0.1% of the light output of the laser towards the laser.

2. An optical apparatus as claimed in claim 1 wherein the laser achieves a frequency stabilization below $1 \times 10^{-7}$ (Frequency noise/Absolute frequency) and the optical feedback is in the range of 0.1% to 10% of the light output of the laser.

3. An optical apparatus as claimed in claim 2 wherein the method of frequency stabilization employed is modal control.

4. An optical apparatus as claimed in claim 3 wherein the modal control is control of the ratio of the intensities of two laser modes.

5. An optical apparatus as claimed in claim 1 wherein the apparatus or the device includes an optical fibre element.

6. An interferometric displacement determination device having an optical apparatus comprising:
    a frequency stabilized linear HeNe gas laser having a resonant cavity, the resonant cavity being filled with a gas including a He content and a Ne content, the Ne content comprising a $Ne^{20}$ isotope and a $Ne^{22}$ isotope in substantially equal proportions; and
    at least one optical feedback element which receives light output from the laser and returns at least 0.1% of the light output of the laser towards the laser, the device being any one of a single beam, a plane mirror, a long range, or an optical fibre type.

7. An interferometric displacement determination device as claimed in claim 6 wherein the $Ne^{20}$ and $Ne^{22}$ isotope content is in the ratio of from about 60:40 to about 40:60 respectively.

8. An interferometric displacement determination device as claimed in claim 6 wherein the HeNe gas ratio is from about 80:20 to about 90:10 respectively.

9. An interferometric displacement determination device having an optical apparatus comprising, a frequency stabilized linear HeNe gas laser having a resonant cavity, the resonant cavity being filled with a gas including a He content and a Ne Content, the Ne content comprising a $Ne^{20}$ isotope and a $Ne^{22}$ isotope in substantially equal proportions; and
    at least one optical feedback element which receives light output from the laser and returns at least 0.1% of the light output of the laser towards the laser.

10. A polarization measurement device having an optical apparatus comprising, a frequency stabilized linear HeNe gas laser having a resonant cavity, the resonant cavity being filled with a gas including a He content and a Ne content, the Ne content comprising a $Ne^{20}$ isotope and a $Ne^{22}$ isotope in substantially equal proportions; and
    at least one optical feedback element which receives light output from the laser and returns at least 0.1% of the light output of the laser towards the laser.

11. A spectroscopic analysis apparatus having an optical apparatus comprising, a frequency stabilized linear HeNe gas laser having a resonant cavity, the resonant cavity being filled with a gas including a He content and a Ne content, the Ne content comprising a $Ne^{20}$ isotope and a $Ne^{22}$ isotope in substantially equal proportions; and
    at least one optical feedback element which receives light output from the laser and returns at least 0.1% of the light output of the laser towards the laser.

12. A heterodyne frequency measurement device having an optical apparatus comprising, a frequency stabilized linear HeNe gas laser having a resonant cavity, the resonant cavity being filled with a gas including a He content and a Ne content, the Ne content comprising a $Ne^{20}$ isotope and a $Ne^{22}$ isotope in substantially equal proportions; and
    at least one optical feedback element which receives light output from the laser and returns at least 0,1% of the light output of the laser towards the laser.

* * * * *